US011129059B2

United States Patent
Chin et al.

(10) Patent No.: US 11,129,059 B2
(45) Date of Patent: Sep. 21, 2021

(54) METHOD AND APPARATUS FOR PROVIDING REDIRECTION FOR RECEPTION OF BROADCAST CONTENT IN A 5G STAND ALONE ENVIRONMENT

(71) Applicant: QUALCOMM Incorporated, San Diego, CA (US)

(72) Inventors: Tom Chin, San Diego, CA (US); Ajith Tom Payyappilly, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/714,147

(22) Filed: Dec. 13, 2019

(65) Prior Publication Data

US 2020/0260339 A1 Aug. 13, 2020

Related U.S. Application Data

(60) Provisional application No. 62/804,784, filed on Feb. 13, 2019.

(51) Int. Cl.
*H04W 4/06* (2009.01)
*H04W 36/00* (2009.01)

(52) U.S. Cl.
CPC ... *H04W 36/0022* (2013.01); *H04W 36/0007* (2018.08); *H04W 36/0044* (2013.01); *H04W 4/06* (2013.01)

(58) Field of Classification Search
CPC ......... H04W 36/0022; H04W 36/0007; H04W 36/0044; H04W 4/06
See application file for complete search history.

(56) References Cited

U.S. PATENT DOCUMENTS

2004/0102212 A1* 5/2004 Sarkkinen ............. H04W 76/40
455/552.1
2012/0039229 A1* 2/2012 Etemad ................ H04B 17/318
370/312
(Continued)

FOREIGN PATENT DOCUMENTS

| EP | 2367395 A1 | 9/2011 |
| EP | 3337234 A1 | 6/2018 |
| EP | 3397005 A1 | 10/2018 |

OTHER PUBLICATIONS

Huawei: "MBMS Service Continuity", 3GPP Draft; R3-112363 MBMS Service Continuity, 3rd Generation Partnership Project (3GPP), Mobile Competence Centre 650, Route Des Lucioles; F-06921 Sophia-Antipolis Cedex; France, vol. RAN WG3, No. Zhuhai; Oct. 10, 2011-Oct. 14, 2011, Sep. 30, 2011 (Sep. 30, 2011), XP050542052, 4 pages, [retrieved on Sep. 30, 2011].

(Continued)

*Primary Examiner* — Barry W Taylor
(74) *Attorney, Agent, or Firm* — Qualcomm Incorporated (57) ABSTRACT

In an aspect of the disclosure, a method, a computer-readable medium, and an apparatus are provided. The apparatus may be a UE. Further, the apparatus may be configured to determine that content is available for reception based on broadcast context information. In an aspect, the apparatus may be in an idle or inactive mode and may be associated with a first base station that is associated with a first radio access technology (RAT) that does not support broadcasting of the content. The apparatus may be further configured to receive a release message from the first base station, the release message including redirection information indicating a second base station associated with a second RAT that supports broadcasting of the content, establish a connection with the second base station based on the redirection infor- (Continued)

mation, and receive the content from the second base station using the second RAT.

26 Claims, 9 Drawing Sheets

(56) References Cited

U.S. PATENT DOCUMENTS

| | | | |
|---|---|---|---|
| 2012/0236776 A1 | 9/2012 | Zhang et al. | |
| 2014/0286222 A1* | 9/2014 | Yu | H04L 12/185 370/312 |
| 2015/0043533 A1* | 2/2015 | Kim | H04W 8/18 370/331 |
| 2015/0245266 A1* | 8/2015 | Lee | H04W 36/16 455/436 |
| 2015/0334769 A1* | 11/2015 | Kim | H04W 76/19 370/329 |
| 2016/0211980 A1* | 7/2016 | Zhu | H04W 4/06 |
| 2018/0035265 A1* | 2/2018 | Kim | H04W 76/25 |
| 2019/0191279 A1* | 6/2019 | Fujishiro | H04W 72/0446 |
| 2019/0268197 A1* | 8/2019 | Al-Daher | H04L 27/2607 |
| 2019/0313469 A1* | 10/2019 | Karampatsis | H04W 36/04 |
| 2019/0349825 A1* | 11/2019 | Tseng | H04W 48/20 |

OTHER PUBLICATIONS

International Search Report and Written Opinion—PCT/US2020/018085—ISA/EPO—dated May 8, 2020.

* cited by examiner

METHOD AND APPARATUS FOR PROVIDING REDIRECTION FOR RECEPTION OF BROADCAST CONTENT IN A 5G STAND ALONE ENVIRONMENT

CROSS REFERENCE TO RELATED APPLICATION(S)

This application claims the benefit of U.S. Provisional Application Ser. No. 62/804,784, entitled "METHOD AND APPARATUS FOR PROVIDING REDIRECTION FOR RECEPTION OF BROADCAST CONTENT IN A 5G STAND ALONE ENVIRONMENT" and filed on Feb. 13, 2019, which is assigned to assigner hereof and expressly incorporated by reference herein in its entirety.

BACKGROUND

Field

The present disclosure relates generally to communication systems, and more particularly, to providing broadcast content (e.g., Evolved Multimedia Broadcast Multicast Services (eMBMS)) in a 5G New Radio (NR) standalone (SA) wireless communications environment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple radio access technologies (RATs) have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Broadcast content providing systems, such as but not limited to eMBMS, may not be supported by all RATs with which a user equipment (UE) may be associated (e.g., 5G NR SA). As such, there is a need for improved redirection procedures to enable a UE to efficiently receive broadcast content.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. Further, the apparatus may be configured to determine that content is available for reception based on broadcast context information. In an aspect, the apparatus may be in an idle or inactive mode and may be associated with a first base station that is associated with a first radio access technology (RAT) that does not support broadcasting of the content. The apparatus may be further configured to receive a release message from the first base station, the release message including redirection information indicating a second base station associated with a second RAT that supports broadcasting of the content, establish a connection with the second base station based on the redirection information, and receive the content from the second base station using the second RAT.

A method of wireless communication is described. The method may be performed by a UE. Further, the method including determining, by a UE, that content is available for reception based on broadcast context information. In an aspect, the UE may be in an idle or inactive mode and may be associated with a first base station that is associated with a first radio access technology (RAT) that does not support broadcasting of the content. The method may further include receiving a release message from the first base station, the release message including redirection information indicating a second base station associated with a second RAT that supports broadcasting of the content, establishing a connection with the second base station based on the redirection information, and receiving the content from the second base station using the second RAT.

An apparatus for wireless communication is described. The apparatus may include means for determining that content is available for reception based on broadcast context information. In an aspect, the apparatus may be in an idle or inactive mode and may be associated with a first base station that is associated with a first radio access technology (RAT) that does not support broadcasting of the content. The apparatus may further include means for receiving a release message from the first base station, the release message including redirection information indicating a second base station associated with a second RAT that supports broadcasting of the content, means for establishing a connection with the second base station based on the redirection information, and means for receiving the content from the second base station using the second RAT.

A non-transitory computer readable medium for wireless communication is described. The non-transitory computer-readable medium may include instructions to cause a processor to determine, by an apparatus, that content is available for reception based on broadcast context information. In an aspect, the apparatus may be in an idle or inactive mode and may be associated with a first base station that is associated with a first radio access technology (RAT) that does not support broadcasting of the content. The non-transitory computer-readable medium may include further instructions to cause a processor to receive a release message from the first base station, the release message including redirection information indicating a second base station associated with a second RAT that supports broadcasting of the content, establish a connection with the second base station based on the redirection information, and receive the content from the second base station using the second RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
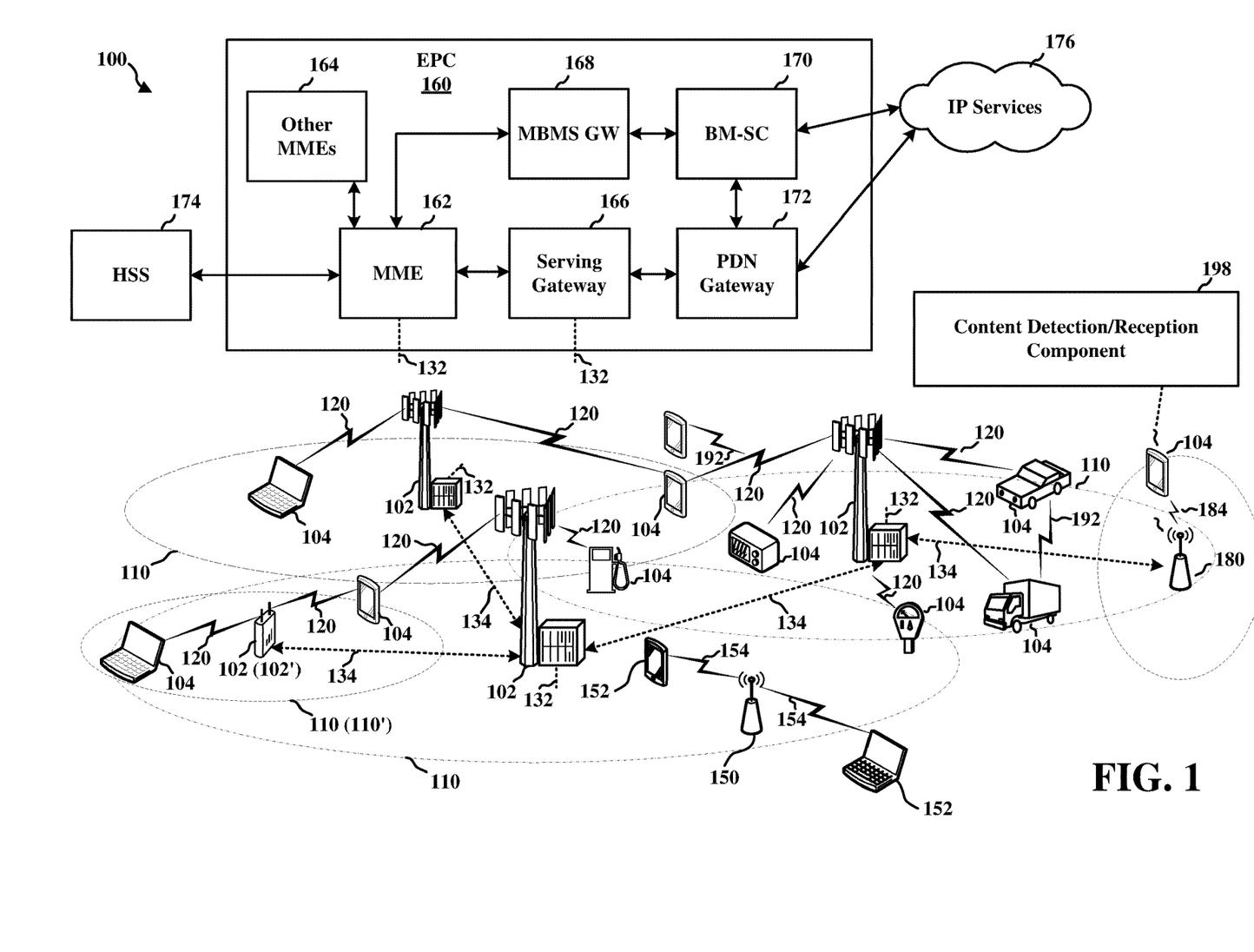
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a content detection/reception component 198. Initially, although the following description may be focused towards discussion of reception of eMBMS based services when a UE is camped on a 5G NR SA cell, the concepts described herein may be applicable to any situation in which a UE is camped on a RAT and/or a cell that does not support reception of broadcast services of which the UE is aware, and there is another RAT and/or cell available to provide such broadcast services. In an aspect, content detection/ reception component 198 may enable UE 104 to establish and/or reestablish reception of broadcast content in an efficient manner. Initially, eMBMS context (e.g., content reception related information) may be received via a unicast channel. The unicast reception the eMBMS context may occur while the UE 104 is camped on a 5G NR SA based cell. The UE 104 may be in a radio resource control (RRC) Idle mode and/or an RRC Inactive mode while being camped on the 5G NR SA based cell. UE 104 can receive eMBMS context by setting up or resuming a connection to receive context using a unicast connection via a 5G NR link. Broadcast services, such as eMBMS have been supported in LTE since Release 9, however eMBMS may not be supported in 5G NR SA based cells. Currently, 5G NR SA based cells do not provide for a mechanism to broadcast any system information block (SIB) to guide UE where to receive eMBMS in LTE. In LTE based cells, eMBMS services may be broadcast using an LTE PMCH channel. Additionally, LTE based cells provide a smooth transition procedure between unicast to multicast using eMBMS Operation on Demand (MooD). As such, content detection/reception component 198 may enable UE 104 to redirect to an LTE based cell to receive the content in a broadcast manner. Furthermore, content detection/reception component 198 may enable UE 104 to return to a 5G NR based cell to receive the content in a unicast manner. In an aspect, content detection/reception component 198 may enable UE 104 to include a cause value (e.g., cause=eMBMS) in a RRC request message (e.g., RRCSetupRequest, RRC ResumeRequest, etc.) prompting the 5G based cell to redirect the UE to an LTE based cell that supports eMBMS broadcasts. In another aspect, a network entity (e.g., MBMS GW 168) may prompt the 5G based cell to redirect the UE to an LTE based cell that supports eMBMS broadcasts.

Figure 2A:
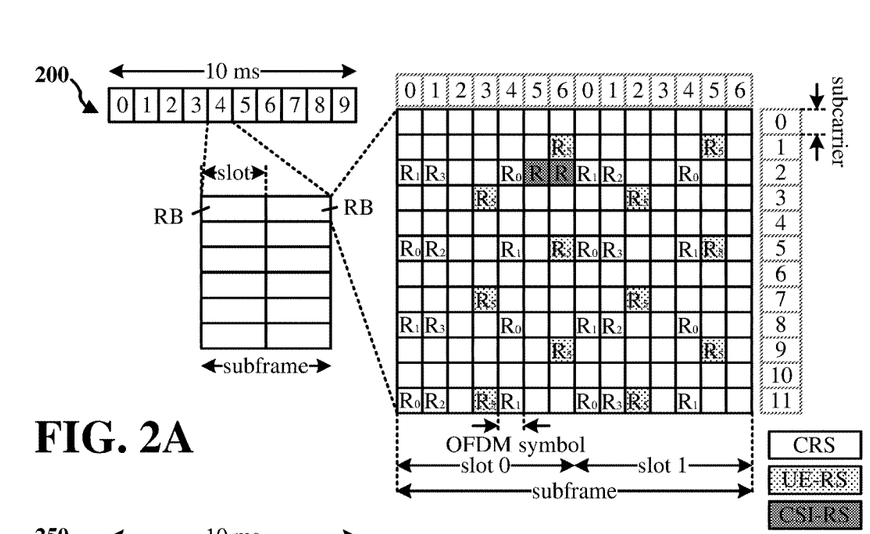
FIGS. 2A, 2B, 2C, and 2D are diagrams illustrating examples of a DL frame structure, DL channels within the DL frame structure, an UL frame structure, and UL channels within the UL frame structure, respectively.
Figure 2B:
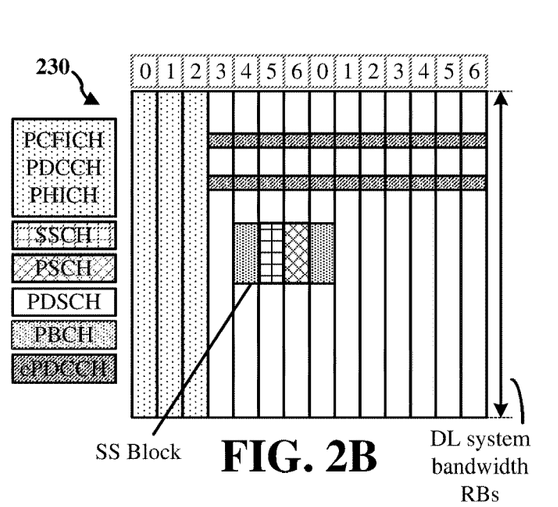
Figure 2C:
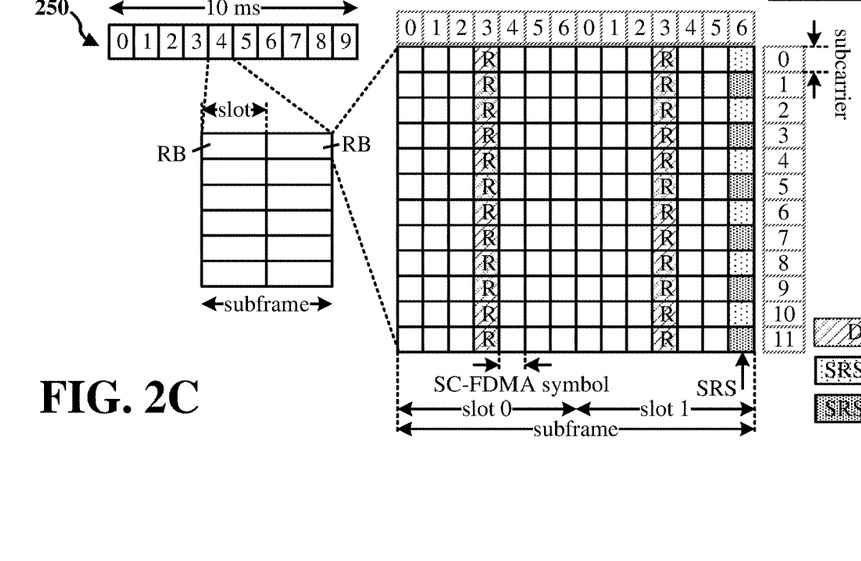
Figure 2D:
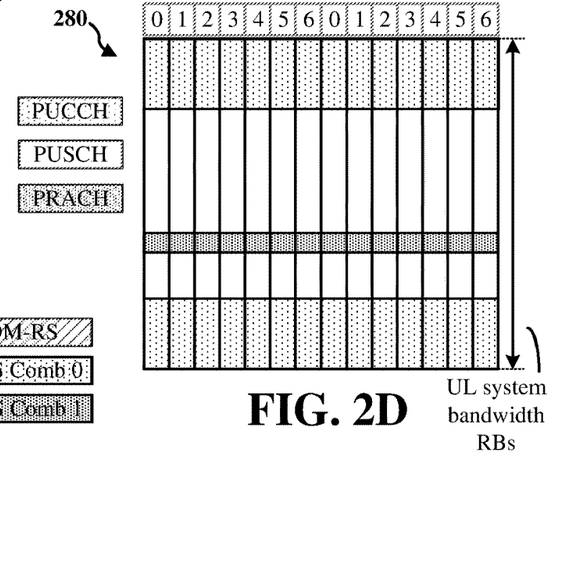

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as SIBs, and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
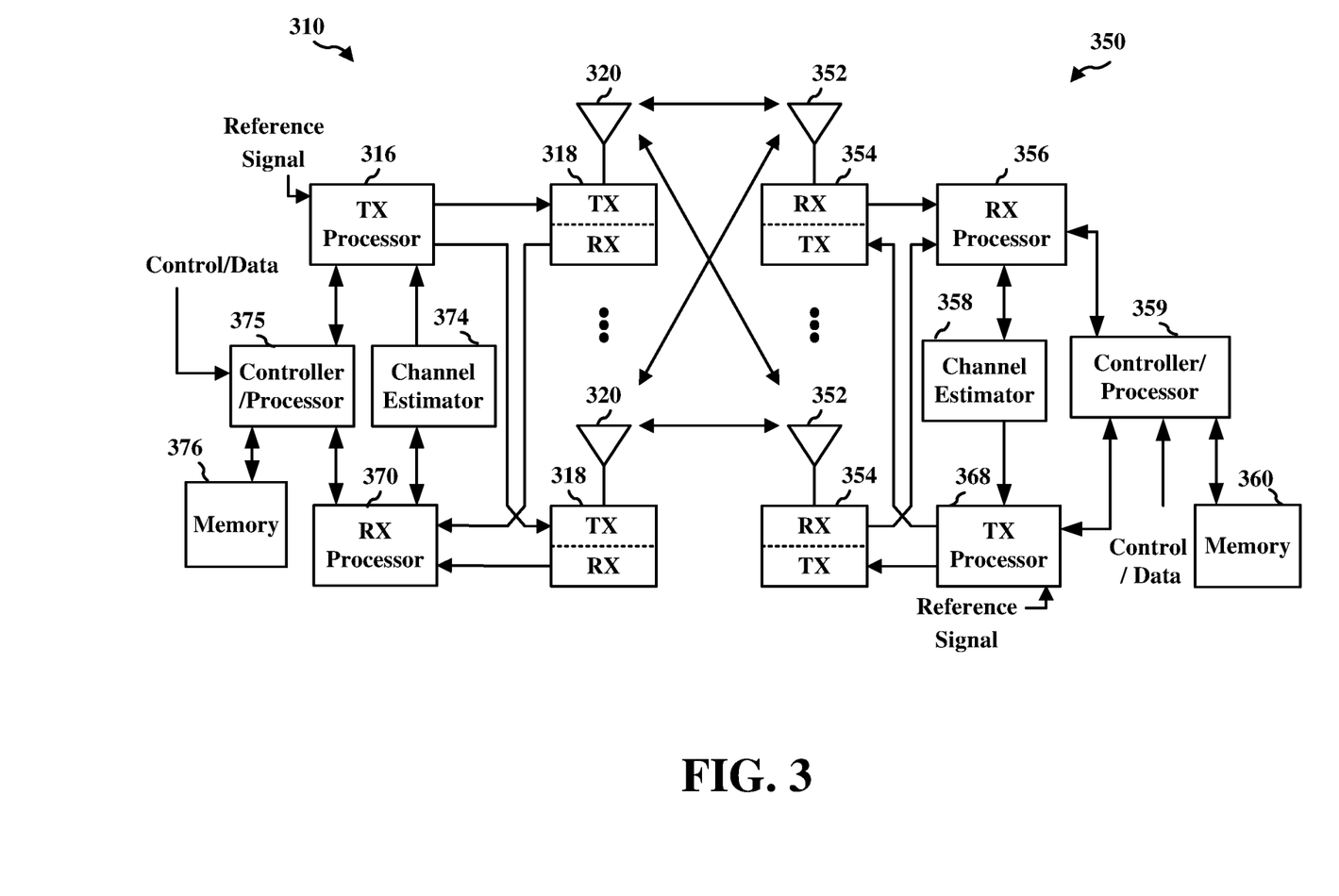
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
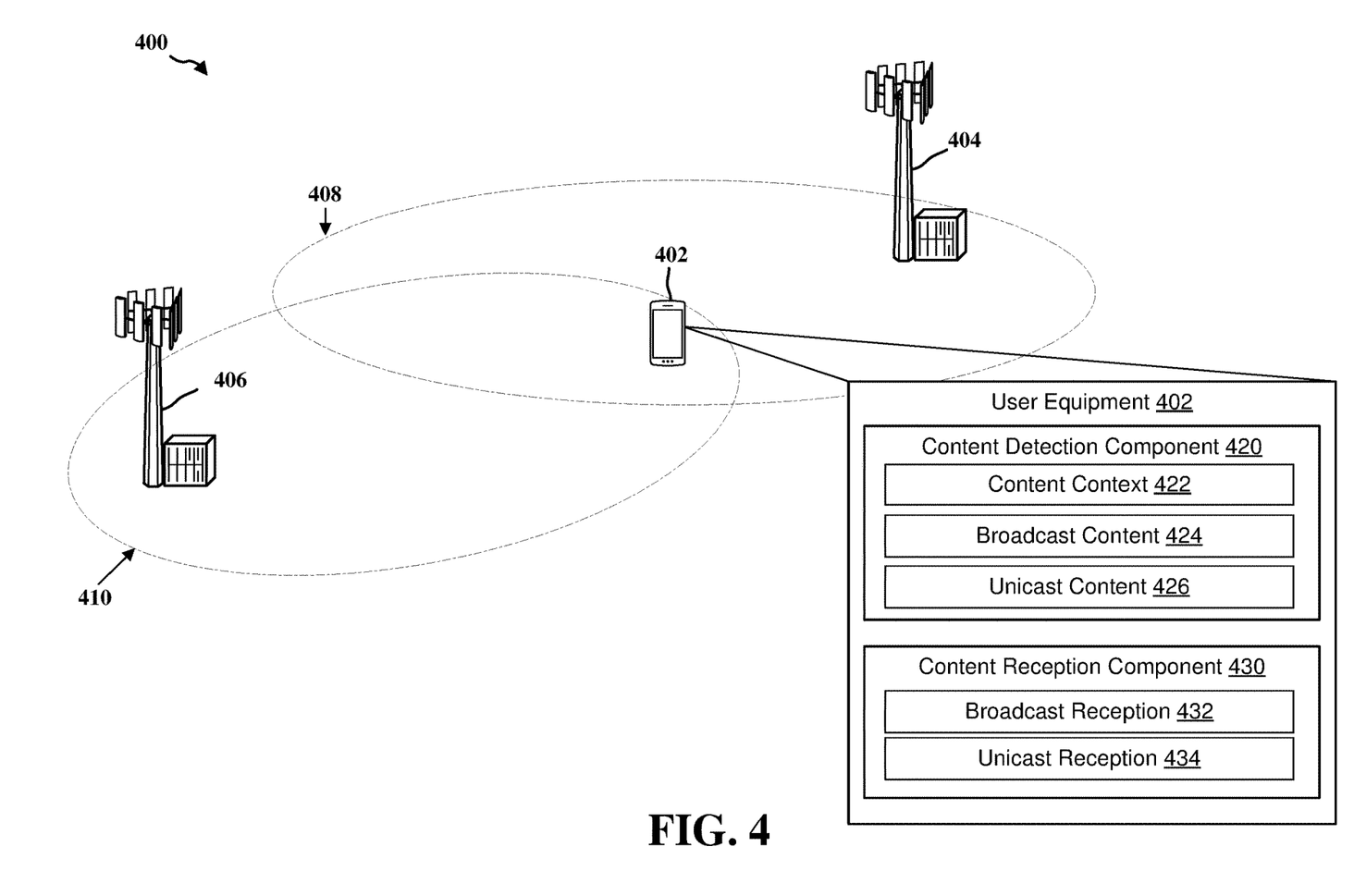
FIG. 4 is a diagram illustrating an example wireless communications system with a UE and multiple RATs.

FIG. 4 is a diagram illustrating an example wireless communications system 400 with a UE 402 that may communicate with one or more base stations (404, 406) using one or more RATs (408, 410). In an aspect, UE 402 may be camped on a cell associated with a RAT (e.g., 5G NR, LTE, 3G, 2G, EV-DO, etc.). For example, UE 402 may be camped on a 5G cell (e.g., communicating with base station 404 using RAT 408). In an aspect, UE 402 may be in an RRC Idle mode, RRC inactive mode, etc. Further, the wireless communications system 400 may include another cell that supports content distribution via broadcast (e.g., base station 406 using LTE based RAT 410).

UE 402 may include content detection component 420 that enables UE 402 to detect availability of broadcast provided content 424 and/or unicast provided content 426. In an aspect, content detection component 420 may use content context (e.g., eMBMS context) to detect what content is available and the manner in which it may be received (e.g., via broadcast or via unicast). UE 402 may further include content reception module 430 that may enable UE 402 to receive broadcast content 424 through broadcast reception 432 and/or unicast content 426 via unicast reception 434.

In an operational aspect, UE 402 may be camped on a 5G cell (e.g., base station 404 supported by 5G RAT 408). Through content context 422, content detection component 420 may determine that content is available for reception through content reception component 430. Further, UE 402 may determine that the content is available via broadcast reception 432 from another cell (e.g., base station 406 via LTE based RAT 410). In such an operational aspect, UE 402 may be redirected to the LTE based cell for broadcast reception 432 of the broadcast content 424. In an aspect, UE 402 may send a request message (e.g., RRC Setup Request, RRC Resume Request) prompting base station 404 to release UE 402 and redirect the UE to the LTE based base station 406. Further, the release message (e.g., RRC Release) may include carrier information for the base station that supports broadcast reception 432 of the broadcast content 424. Still further, the release message may include broadcast frequency (e.g., eMBMS frequency) information to expedite the redirection process to the base station 406 that supports broadcasting the content. In another operational aspect, once UE 402 is receiving content via broadcast reception 432 from base station 406, the UE 402 may be directed to return to the 5G based RAT 408 and receive the content via unicast reception 434 from base station 404.

Figure 5:
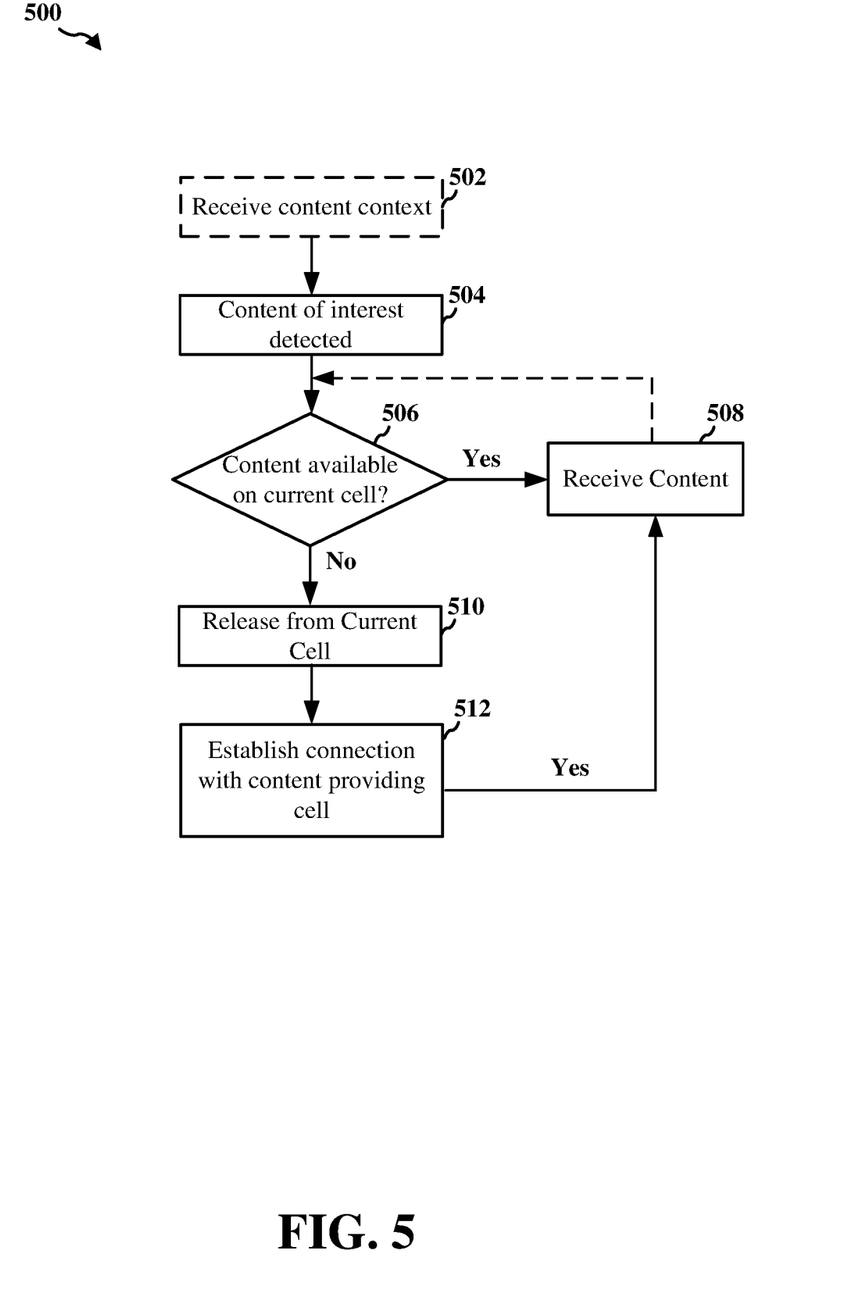
FIG. 5 is a flowchart of a method of wireless communication.

FIG. 5 is a flowchart 500 of a method of wireless communication. The method may be performed by a UE (e.g., UE 104, UE 402). In an optional aspect, at 502, the UE may receive content context. As noted above, the content context may provide the UE with information associated with reception of content via broadcast and/or unicast transmissions. Further, in an aspect, the content context may be received from an upper layer and/or while the UE was in a connected state. In an aspect, UE 402 content detection component 420 may be configured to receive the content context 422 such as described at 502.

At 504, the UE may detect that there is content of interest. In other words, the UE may determine, from the content context, that there is content that a user of the UE may be interested in receiving. In an aspect, UE 402 content detection component 420 and/or content reception component 320 may be configured to determine if there is content of interest to be received as described at 504.

At 506, the UE may determine whether the content is available on a cell currently serving the UE. For example, when a UE is camped on a 5G NR based cell, the UE may not be able to receive content via a broadcast communication. In another example, when the UE is camped on the 5G NR based call, the UE may be able to receive content via a unicast communication. In an aspect, UE 402 content reception component 430 may determine whether the UE is able to receive the content of interest. If at 506, the UE determines that the content of interest is able to be received via the cell upon which the UE is currently camped, then at 508, the UE may proceed with receiving the content. In an aspect, reception of the content may also include any intermediate setup steps that allow the UE to receive the content.

By contrast, if at 506, the UE determines that the content of interest is not able to be received via the cell upon which the UE is currently camped, then at 510, the UE may be released from the current cell. In an optional aspect, the UE may be released from the current cell by transmitting a request message (e.g., RRC Setup, RRC Resume) with a cause value (e.g., cause=eMBMS) indicating that there is content of interest available from another cell. In another aspect, a network entity may be aware that the UE has expressed an interest in reception of content, and that the UE is currently camped on a cell that does not support broadcast transmission of the content. In such an aspect, the network entity may prompt the base station to release the UE and provide the UE with information related to a base station that can provide the content of interest via broadcast. Further, in such an aspect, the network entity may provide the currently serving base station with frequency information for the base station that can provide the content of interest via broadcast. In an aspect, UE 402 content reception component 430 may be configured to enable broadcast reception 432 and/or unicast reception 434 depending at least in part of which base station can provide the content of interest and the manner in which the UE intends to receive the content of interest as described at 510.

At 512, the UE may establish a connection with a cell that can provide the content of interest via a selected reception manner (e.g., broadcast or unicast). As noted above, the UE may receive information related to a base station that can support transmission of the content of interest via the selected reception manner. The information may be in the form of an information element (IE) in an RRC release message (e.g., RRC Release (redirectedcarrierinfo). Additionally, as noted above, the information may further include frequency information (e.g., eMBMS frequency). In an aspect, UE 402 content reception component 430 may enable the UE to establish a connection with a cell/base station that can provide the content of interest via a selected reception manner (e.g., broadcast or unicast) as describe at 512. Once the UE has established a connection with a base station that provide the content of interest, the UE may, at 508, receive the content. In an optional aspect, the UE may switch the manner in which it received the content of interest. For example, a network entity may decide that the content of interest should be received via unicast rather than broadcast. In another example, the UE may lose the broadcast signal. In such instances, the UE may switch base stations and/or reception modes until it is connected to a base station that supports transmission of the content of interest. For example, the UE may return to the 5G NR based cell/base station and receive the content of interest via unicast.

Figure 6:
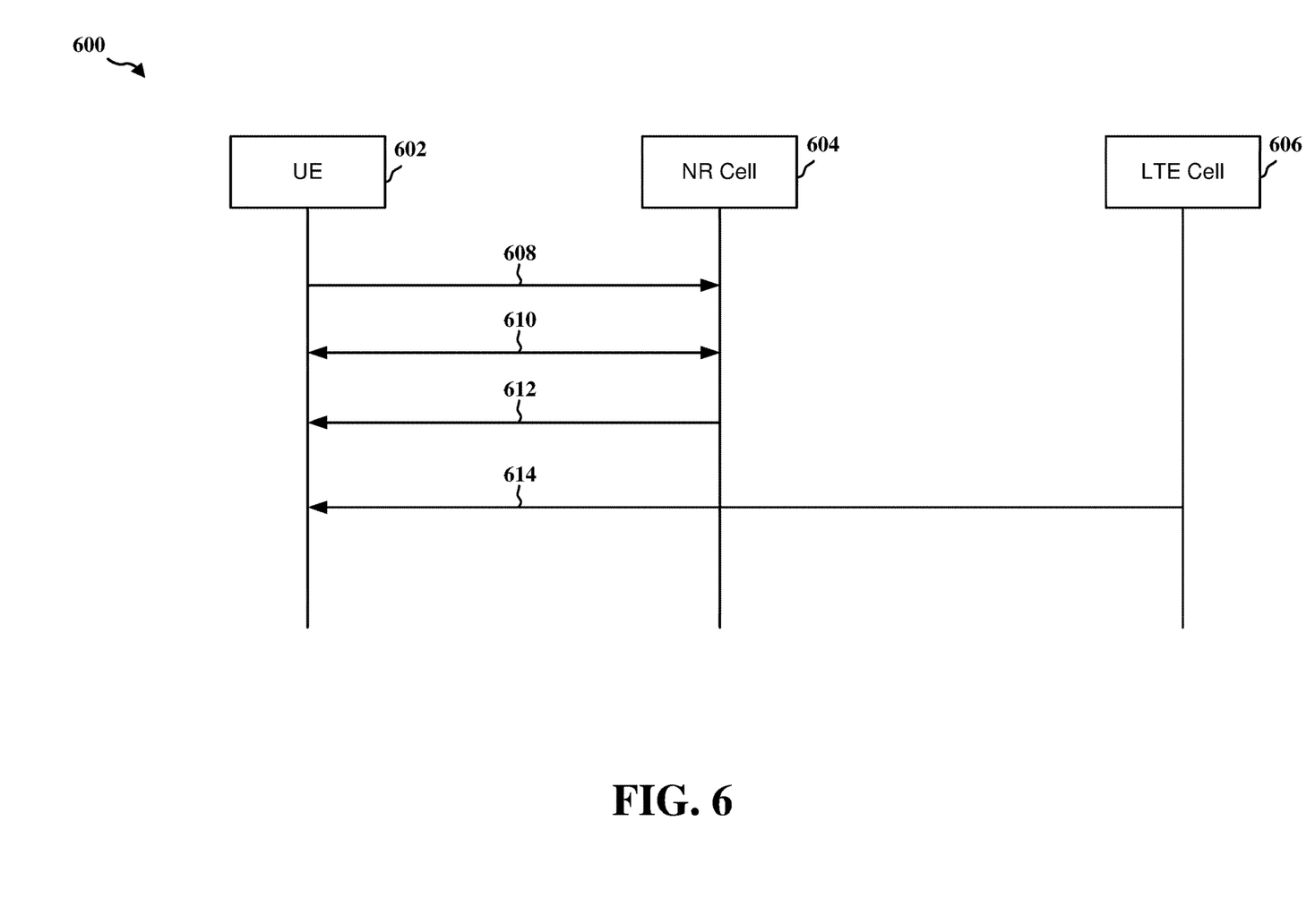
FIG. 6 is a call flow diagram illustrating a broadcast content redirection procedure in an example aspect.

FIG. 6 is a call flow diagram 600 illustrating interactions between a UE 602, a NR based cell 604, and an LTE based cell 606 according to an aspect. In the depicted aspect, the UE 602 may be in an RRC idle and/or RRC inactive mode in communication with NR based cell 604. Further, UE 602 may have content context (e.g., eMBMS context) providing content reception related information for one or more content items of potential interest. For example, the UE 602 may have received the content context via a unicast communication.

At 608, UE 602 may determine that a content item of interest is potentially available and transmit a request message 608 to NR based Cell 604. For example, the request message 608 may be an RRC setup request message, an RRC Resume Request message, etc. In an aspect, the cause value may indicate an interest to receive broadcast content (e.g., cause=eMBMS).

At 610, the UE 602 and NR based cell 604 may transition into an RRC connected state. In an aspect, the transition into the RRC connected state may be based on the request message transmitted by the UE 602. For example, an RRC Connection Setup process may be associated with reception of an RRC Setup Request message. Similarly, an RRC Connection Reconfiguration process may be associated with reception of an RRC Resume Request.

At 612, the NR based cell 604 may transmit a release message 612 redirecting the UE 602 to the LTE based cell 606. In an aspect, the UE is redirected to the LTE based cell 606 because the LTE based cell 606 supports broadcast transmissions of the content of interest. In an aspect, the release message may include an IE (e.g., redirected CarrierInfo) indicating the LTE based cell 606 to which to redirect. The UE 602 may establish a connection with the LTE based cell 606.

At 614, the UE 602 may receive the content of interest as it is broadcast 614 by the LTE based cell 606.

Figure 7:
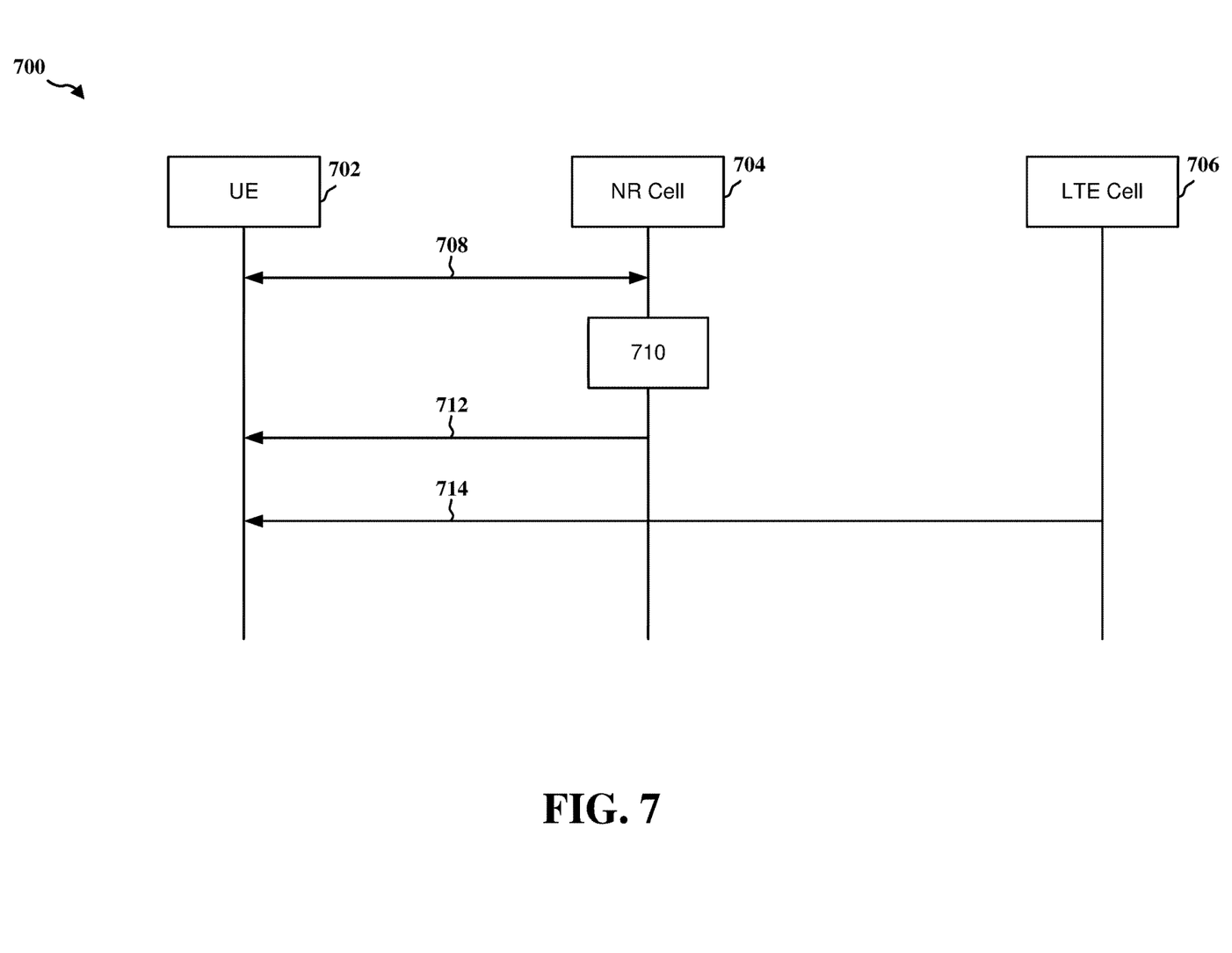
FIG. 7 is a call flow diagram illustrating a broadcast content redirection procedure in another example aspect.

FIG. 7 is a call flow diagram 700 illustrating interactions between a UE 702, a NR based cell 704, and an LTE based cell 706 according to another aspect. In the depicted aspect, the UE 702 may be in an RRC idle and/or RRC inactive mode in communication with NR based cell 704. Further, UE 702 may have content context (e.g., eMBMS context) providing content reception related information for one or more content items of potential interest. For example, the UE 702 may have received the content context via a unicast communication.

At 708, the UE 702 and NR based cell 704 may transition into an RRC connected state. In an aspect, the transition into the RRC connected state may be based on information from a network entity (e.g., 5G core network entity) and associated with the content the UE received.

At 710, NR based cell 704 may check context information and determine a cell to which to redirect. For example, the NR based cell 704 may check eMBMS context and determine an LTE frequency to which to redirect the UE 702.

At 712, the NR based cell 704 may transmit a release message 712 redirecting the UE 702 to the LTE based cell 706. In an aspect, the UE is redirected to the LTE based cell 706 because the LTE based cell 706 supports broadcast transmissions of the content of interest. In an aspect, the release message may include an IE (e.g., RedirectedCarrierinfo) indicating the LTE based cell 706 to which to redirect. The UE 702 may establish a connection with the LTE based cell 706.

At 714, the UE 702 may receive the content of interest as it is broadcast 714 by the LTE based cell 706.

Figure 8:
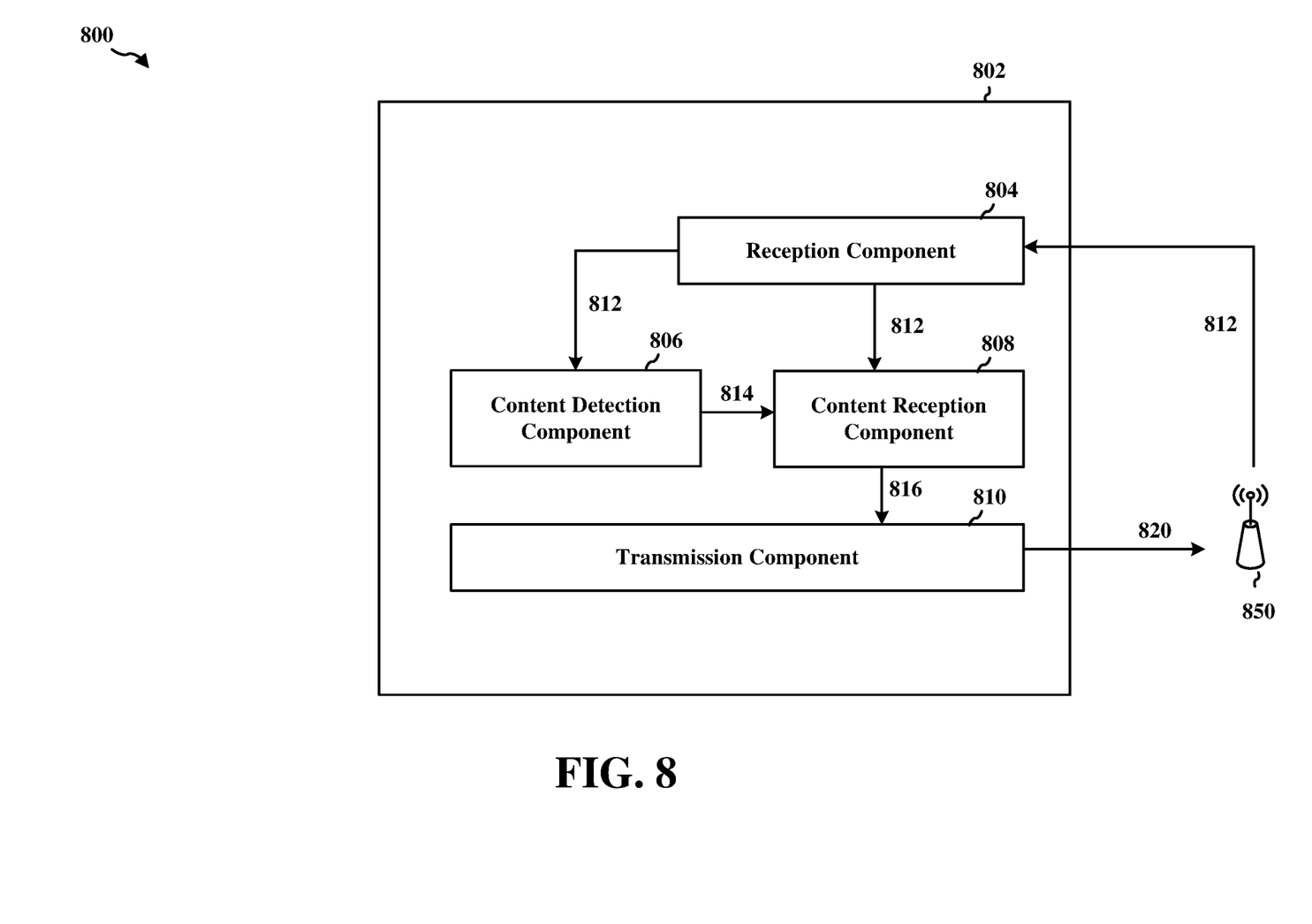
FIG. 8 is a conceptual data flow diagram illustrating the data flow between different means/components in an example apparatus.

FIG. 8 is a conceptual data flow diagram 800 illustrating the data flow between different means/components in an exemplary apparatus 802. The apparatus may be a UE. The apparatus includes a reception component 804 that may receive information 812 from the network 850, content detection component 806 that may, based at least partially on the received information 812, determine that content of interest 814 is available, a content reception component 808 that may enable UE 802 to determine whether the content of interest 814 is to be received via unicast or broadcast transmission, and a transmission component 810 to enable to UE 800 to request 820 to be redirected to a cell that supports broadcasting the content of interest 814.

The apparatus may include additional components that perform each of the blocks of the algorithm in the aforementioned flowchart of FIG. 5 and call flows of FIGS. 6 and 7. As such, each block in the aforementioned flowchart of FIG. 5 and steps in the aforementioned call flows of FIGS. 6 and 7 be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
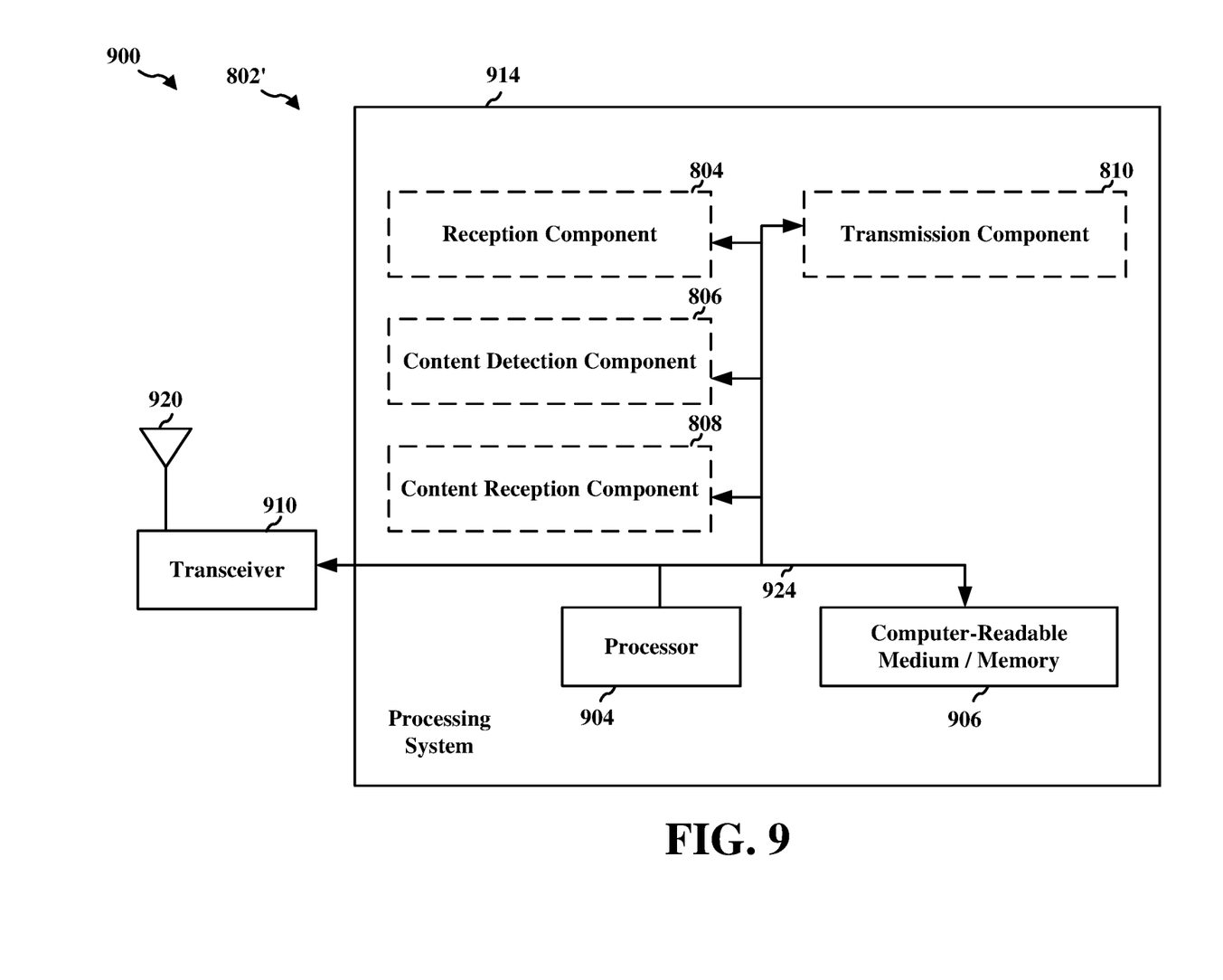
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810 and the computer-readable medium/memory 806. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 904. In addition, the transceiver 910 receives information from the processing system 914, specifically the transmission component 910, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 804, causes the processing system 914 to perform the various functions described supra for any particular apparatus. The computer-readable medium/memory 806 may also be used for storing data that is manipulated by the processor 804 when executing software. The processing system 914 further includes at least one of the components 804, 806, 808, 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining that content is available for reception based on broadcast context information. In an aspect, the UE may be in an idle or inactive mode, and the UE may be associated with a first base station that is associated with a first RAT that does not support broadcasting of the content. The apparatus 802/802' for wireless communication further include means for receiving a release message from the first base station, the release message including redirection information indicating a second base station associated with a second RAT that supports broadcasting of the content, means for establishing a connection with the second base station based on the redirection information, and means for receiving the content from the second base station using the second RAT. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, by a user equipment (UE), comprising:
    determining, by the UE, that content is available for reception via broadcast based on broadcast context information, wherein the UE is in an idle or inactive mode, and wherein the UE is associated with a first base station that is associated with a first radio access technology (RAT) that only supports unicasting but not broadcasting of the content;
    determining whether the content is available via broadcast by the first base station;
    transmitting a set up message with a cause value to the first base station in response to determination that the content is not available via broadcast by the first base station;
    receiving a release message from the first base station based on the cause value, the release message including redirection information indicating a second base station associated with a second RAT that supports broadcasting of the content;
    establishing a connection with the second base station based on the redirection information; and
    receiving the content from the second base station using the second RAT.

2. The method of claim 1, wherein the set up message is a Radio Resource Control (RRC) set up message or an RRC resume request message.

3. The method of claim 1, wherein the release message is transmitted by the first base station based on a core network entity prompting the first base station to transmit the release message, the core network entity having the broadcast context information and information about the UE.

4. The method of claim 1, further comprising:
    receiving broadcast context information from a network entity while the UE is in a connected state.

5. The method of claim 1, wherein the content is received via a broadcast transmission from the second base station.

6. The method of claim 1, further comprising:
    returning to the first base station; and
    receiving the content via a unicast transmission.

7. The method of claim 1, wherein the release message further includes frequency information for the second base station.

8. The method of claim 1, wherein the broadcast context information is an Evolved Multimedia Broadcast Multicast Services (eMBMS) context.

9. The method of claim 1, wherein the first RAT is 5G new radio (NR), the first base station is a 5G Node N (gNB), the second RAT is Long Term Evolution (LTE), and the second base station is an evolved Node B (eNB).

10. An apparatus for wireless communications, comprising:
    means for determining, by the user equipment (UE), that content is available for reception via broadcast based on broadcast context information, wherein the UE is in an idle or inactive mode, and wherein the UE is associated with a first base station that is associated with a first radio access technology (RAT) that only supports unicasting but not broadcasting of the content;
    means for determining whether the content is available via broadcast by the first base station;

means for transmitting a set up message with a cause value to the first base station in response to determination that the content is not available via broadcast by the first base station;

means for receiving a release message from the first base station based on the cause value, the release message including redirection information indicating a second base station associated with a second RAT that supports broadcasting of the content;

means for establishing a connection with the second base station based on the redirection information; and means for receiving the content from the second base station using the second RAT.

11. The apparatus of claim 10, wherein the set up message is a Radio Resource Control (RRC) set up message or an RRC resume request message.

12. The apparatus of claim 10, wherein the release message is transmitted by the first base station based on a core network entity prompting the first base station to transmit the release message, the core network entity having the broadcast context information and information about the UE.

13. The apparatus of claim 10, further comprising:
means for receiving broadcast context information from a network entity while the UE is in a connected state.

14. An apparatus for wireless communications, comprising:
Memory coupled to at least one processor, the at least one processor configured to:
determine, by an user equipment (UE), that content is available for reception via broadcast based on broadcast context information, wherein the UE is in an idle or inactive mode, and wherein the UE is associated with a first base station that is associated with a first radio access technology (RAT) that only supports unicasting but not broadcasting of the content;
determine whether the content is available via broadcast by the first base station;
transmit a set up message with a cause value to the first base station in response to determination that the content is not available via broadcast by the first base station;
receive a release message from the first base station based on the cause value, the release message including redirection information indicating a second base station associated with a second RAT that supports broadcasting of the content;
establish a connection with the second base station based on the redirection information; and
receive the content from the second base station using the second RAT.

15. The apparatus of claim 14, wherein the set up message is a Radio Resource Control (RRC) set up message or an RRC resume request message.

16. The apparatus of claim 14, wherein the release message is transmitted by the first base station based on a core network entity prompting the first base station to transmit the release message, the core network entity having the broadcast context information and information about the UE.

17. The apparatus of claim 14, wherein the at least one processor is further configured to:
receive broadcast context information from a network entity while the UE is in a connected state.

18. The apparatus of claim 14, wherein the content is received via a broadcast transmission from the second base station.

19. The apparatus of claim 14, wherein the at least one processor is further configured to:
return to the first base station; and
receive the content via a unicast transmission.

20. The apparatus of claim 14, wherein the release message further includes frequency information for the second base station.

21. The apparatus of claim 14, wherein the broadcast context information is an Evolved Multimedia Broadcast Multicast Services (eMBMS) context.

22. The apparatus of claim 14, wherein the first RAT is 5G new radio (NR), the first base station is a 5G Node N (gNB), the second RAT is Long Term Evolution (LTE), and the second base station is an evolved Node B (eNB).

23. A non-transitory computer-readable medium, comprising code executable by one or more processors to:
determine, by a user equipment (UE), that content is available for reception via broadcast based on broadcast context information, wherein the UE is in an idle or inactive mode, and wherein the UE is associated with a first base station that is associated with a first radio access technology (RAT) that only supports unicasting but not broadcasting of the content;
determine whether the content is available via broadcast by the first base station;
transmit a set up message with a cause value to the first base station in response to determination that the content is not available via broadcast by the first base station;
receive a release message from the first base station based on the cause value, the release message including redirection information indicating a second base station associated with a second RAT that supports broadcasting of the content;
establish a connection with the second base station based on the redirection information; and
receive the content from the second base station using the second RAT.

24. The non-transitory computer-readable medium of claim 23, wherein the set up message is a Radio Resource Control (RRC) set up message or an RRC resume request message.

25. The non-transitory computer-readable medium of claim 23, wherein the release message is transmitted by the first base station based on a core network entity prompting the first base station to transmit the release message, the core network entity having the broadcast context information and information about the UE.

26. The non-transitory computer-readable medium of claim 23, wherein the code is further executable by one or more processors to:
receive broadcast context information from a network entity while the UE is in a connected state.

* * * * *